United States Patent
Winkler et al.

(10) Patent No.: US 10,500,960 B2
(45) Date of Patent: Dec. 10, 2019

(54) METHOD FOR OPERATING AN ELECTRICAL SYSTEM OF A MOTOR VEHICLE, AND MOTOR VEHICLE

(71) Applicant: AUDI AG, Ingolstadt (DE)

(72) Inventors: Josef Winkler, Kipfenberg (DE); Bernhard Stock, Adelschlag (DE); Thomas Hackner, Greding (DE)

(73) Assignee: AUDI AG, Ingolstadt (DE)

( * ) Notice: Subject to any disclaimer, the term of this patent is extended or adjusted under 35 U.S.C. 154(b) by 43 days.

(21) Appl. No.: 15/735,809

(22) PCT Filed: Jun. 10, 2016

(86) PCT No.: PCT/EP2016/000969
§ 371 (c)(1),
(2) Date: Dec. 12, 2017

(87) PCT Pub. No.: WO2017/001046
PCT Pub. Date: Jan. 5, 2017

(65) Prior Publication Data
US 2019/0031030 A1    Jan. 31, 2019

(30) Foreign Application Priority Data
Jun. 30, 2015   (DE) .................. 10 2015 008 445

(51) Int. Cl.
*B60L 1/00*     (2006.01)
*B60L 3/00*     (2019.01)
(Continued)

(52) U.S. Cl.
CPC ............... *B60L 3/00* (2013.01); *B60L 3/0046* (2013.01); *B60L 3/0069* (2013.01); *B60L 3/04* (2013.01); *B60R 16/033* (2013.01)

(58) Field of Classification Search
CPC .. B60L 3/00; B60L 3/0038; B60L 3/04; B60L 3/0069; B60L 3/0046; B60R 16/033
See application file for complete search history.

(56) References Cited

U.S. PATENT DOCUMENTS 7,095,137 B2   8/2006   Mäckel et al.
7,779,942 B2   8/2010   Kaindl et al.
(Continued)

FOREIGN PATENT DOCUMENTS

DE   4211578 C1    4/1993
DE   10160266 A1   6/2003
(Continued)

OTHER PUBLICATIONS

International Search Report and Written Opinion of the International Searching Authority, directed to related International Patent Application No. PCT/EP2016/000969, dated Aug. 18, 2016, with attached English-language translation; 21 pages.
(Continued)

*Primary Examiner* — Rexford N Barnie
*Assistant Examiner* — Rasem Mourad
(74) *Attorney, Agent, or Firm* — Sterne, Kessler, Goldstein & Fox P.L.L.C.

(57) ABSTRACT

A method is disclosed for operating an electrical system of a motor vehicle, said electrical system comprising a first power source for providing an operating voltage for at least one partial onboard network of the electrical system and at least a second power source, wherein an electrically conductive connection of the first power source to the electrical system is monitored for an intentional interruption and, in the event of a detected intentional interruption of the electrically conductive connection, the at least one second power source of the electrical system is separated therefrom or deactivated. A motor vehicle with an onboard electrical
(Continued)

system and a control device, for execution of the method, are also disclosed.

14 Claims, 1 Drawing Sheet

(51) Int. Cl.
*H02G 3/00* (2006.01)
*B60L 3/04* (2006.01)
*B60R 16/033* (2006.01)

(56) References Cited

U.S. PATENT DOCUMENTS

| | | | |
|---|---|---|---|
| 2005/0162795 | A1 | 7/2005 | Leiber |
| 2008/0079389 | A1* | 4/2008 | Howell ............... H02J 7/1438 320/104 |
| 2013/0154356 | A1 | 6/2013 | Nakajima |
| 2013/0293237 | A1* | 11/2013 | Thommes ............ B60L 3/0069 324/503 |
| 2016/0059806 | A1 | 3/2016 | Thömmes et al. |
| 2017/0129339 | A1* | 5/2017 | Krammer ............... B60L 1/00 |

FOREIGN PATENT DOCUMENTS

| | | | | |
|---|---|---|---|---|
| DE | 10243970 | A1 | | 4/2004 |
| DE | 10313752 | A1 | | 10/2004 |
| DE | 10344896 | A1 | | 4/2005 |
| DE | 102004056868 | A1 | | 6/2006 |
| DE | 102006044814 | A1 | | 4/2008 |
| DE | 102008031125 | A1 | | 1/2010 |
| DE | 102009051293 | A1 | | 5/2011 |
| DE | 102011104223 | A1 | | 12/2012 |
| DE | 102011104223 | A1 | * | 12/2012 ............ B60R 16/03 |
| DE | 102011104224 | A1 | | 12/2012 |
| DE | 102011109707 | A1 | | 2/2013 |
| DE | 102012006104 | A1 | | 9/2013 |
| DE | 102013006254 | A1 | | 10/2014 |
| WO | WO-2015025089 | A1 | * | 2/2015 ............ G01R 31/006 |
| WO | WO 2015025089 | A1 | | 2/2015 |

OTHER PUBLICATIONS

International Preliminary Report on Patentability, directed to related International Patent Application No. PCT/EP2016/000969, dated Oct. 11, 2017, with attached English-language translation; 17 pages.
English-language abstract of German Patent Application Publication No. DE 4211578 C1, published Apr. 29, 1993; 1 page.
English-language abstract of German Patent Application Publication No. DE 10313752 A1, published Oct. 7, 2004; 1 page.
English-language abstract of German Patent Application Publication No. DE 10344896 A1, published Apr. 21, 2005; 1 page.
English-language abstract of German Patent Application Publication No. DE 102004056868 A1, published Jun. 1, 2006; 1 page.
English-language abstract of German Patent Application Publication No. DE 102008031125 A1, published Jan. 7, 2010; 2 pages.
English-language abstract of German Patent Application Publication No. DE 102009051293 A1, published May 5, 2011; 1 page.
English-language abstract of German Patent Application Publication No. DE 102011104223 A1, published Dec. 20, 2012; 1 page.
English-language abstract of German Patent Application Publication No. DE 102011104224 A1, published Dec. 20, 2012; 2 pages.
English-language abstract of German Patent Application Publication No. DE 102011109707 A1, published Feb. 7, 2013; 2 pages.
English-language abstract of German Patent Application Publication No. DE 102012006104 A1, published Sep. 26, 2013; 1 page.
English-language abstract of International Patent Application Publication No. WO 2015025089 A1, published Feb. 26, 2015; 1 page.
Office Action directed to related Chinese Patent Application No. 201680038578.3, dated Sep. 4, 2019; 6 pages.

* cited by examiner

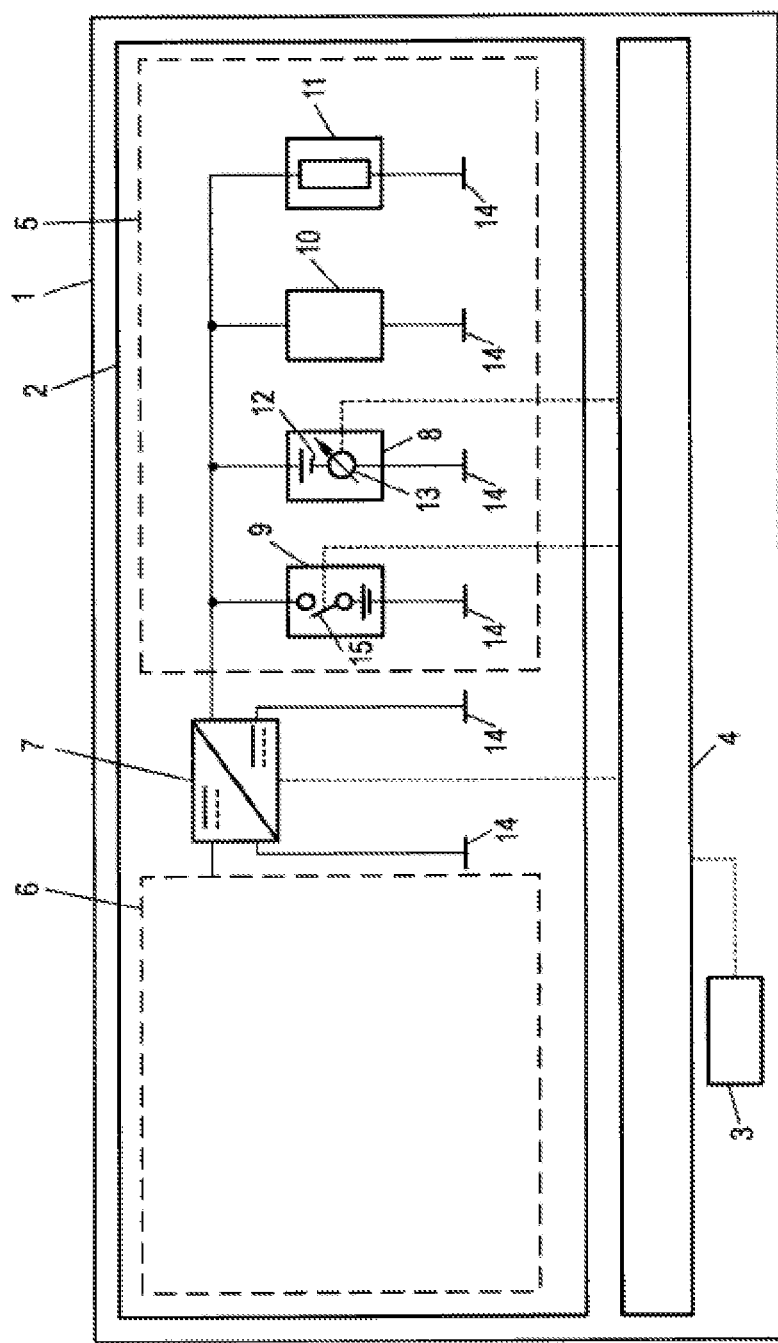

METHOD FOR OPERATING AN ELECTRICAL SYSTEM OF A MOTOR VEHICLE, AND MOTOR VEHICLE

TECHNICAL FIELD

This application relates to a method for operating an electrical system of a motor vehicle, said electrical system comprising a first power source for providing an operating voltage for at least one part of the electrical system and at least a second power source. The disclosure herein also relates to a motor vehicle.

BACKGROUND

While in the past the electrical systems of a vehicle were normally supplied with power by a single power source, typically a lead-acid battery disposed in the motor compartment, modern motor vehicles are also provided with much more complex electrical supply structures. The onboard electrical system may be composed of a plurality of partial electrical systems, for example, which operate at different voltage levels. A partial electrical system may also be provided with a plurality of different types of power sources. The term power source comprises all devices which may be used as a source of current and/or voltage for at least one partial electrical system.

Due to the increased complexity of such onboard electrical systems, it may happen, for example, that in case of repair and/or maintenance work, by detaching a determined power source, such as in particular a battery mounted in the motor compartment, it cannot be ensured that the entire electrical system is effectively voltage-free. An operator performing the repair or maintenance should initially study complex documents in order to find all power sources to be considered while working on the motor vehicle. In many cases the operator is however not informed about further power sources that may be mounted in the motor vehicle in addition to the first power source. Another drawback is found in such complex electrical systems in case of rescue operations, in which the rescue personnel usually wants to ensure the removal of voltage for their safety and the safety of third parties. To this end, it was proposed to provide so-called rescue maps available on the motor vehicle, in which the positions of individual energy storage systems on the motor vehicle are schematically represented.

BRIEF DESCRIPTION OF THE DRAWINGS/FIGURES

FIG. 1 illustrates a schematic representation of an exemplary embodiment of a motor vehicle with an onboard electrical system, a bus system, and a control device for performing the method disclosed herein.

DETAILED DESCRIPTION

Disclosed herein are methods and systems that enable a safer operable onboard electrical system of a motor vehicle, while not requiring an operator to know and manually remove a second source of voltage prior to maintenance or rescue operations, for example.

The disclosed method provides that an electrically conductive connection of the first power source is monitored for an intentional interruption, and if an intentional interruption of the electrically conductive connection is detected, the at least one second power source of the onboard electrical system is separated therefrom and/or deactivated.

In an exemplary embodiment of the method, the electrically conductive connection of the first power source, i.e., a battery bank consisting of a lead-acid battery positioned in the motor compartment, for example, is monitored for an intentional, or voluntarily performed, removal of an electrical contact by an operator. If this decisional criterion is met, then the at least one second power source of the electrical system is separated therefrom and/or deactivated. The second power source provides electrical voltage or current for the electrical system and/or optionally for a further partial electrical system. The second power source is spatially separated on the motor vehicle from the first power source, further facilitating the safety effect of the method during an intentional interruption of the first power source. In particular, because the power sources are possibly not within the field of vision of the operator, they may easily go undetected during voltage removal from the onboard supply circuit.

Thus, in case of repair and/or maintenance activity or rescue operations, the method provides the advantage that the intentional interruption of the first power source entails the separation and/or deactivation of at least one second power source from the onboard electrical system, so that a voltage-free state of the onboard electrical system may be ensured in above said applications. Thus, short-circuits, which may arise due to unawareness or carelessness in handling the second power source, may be avoided. The onboard electrical system and, in turn, the motor vehicle are thus operable in a much safer way.

In an exemplary embodiment of the method, it is particularly advantageous if the electrically conductive connection to be monitored is between a negative pole of the first power source and the motor vehicle mass, specifically the chassis ground, for example. Because the usual rules that apply in this sector dictate that, in case of an intentional interruption of the electrically conductive connection of the first power source with the onboard electrical system, the negative pole of the first power source (and its negative terminal) has to be separated from the motor vehicle mass, such a monitoring in the context of the decisional criteria is particularly useful. For a small number of vehicle types, because a connection of the positive pole, i.e., the pole having the higher electrostatic potential, is provided as part of the motor vehicle mass, monitoring of the positive terminal of the first power source is also possible.

In another embodiment of the method, it is also advantageous if a current sensor adapted for detecting a current flowing through the first power source is assigned to the first power source, wherein the interruption of the electrically conductive connection is detected when the current sensor detects no current through the power source. By means of such a current sensor, the interruption of the electrically conductive connection may be detected particularly effectively by monitoring a current threshold from the positive pole of the first power source, for example. Similarly, if the electrically conductive connection of a negative pole of the first power source with the motor vehicle mass is monitored, then it is particularly convenient if the current sensor detects the electric current flowing to the negative pole, for example. In either exemplary case, minimum threshold values for the amount of current may be defined for detecting an interruption. Such a threshold value may be selected, for example, as equal to 1 mA. The person of ordinary skill in the art, however, will choose a suitable current value, depending on the concrete configuration of the onboard electrical system, in order to detect an absence of current, suitably taking into account noise signals of about 0 A, for recognizing the intentional interruption of the electrically conductive connection.

In another exemplary embodiment of the method, it is particularly preferred that the at least one second power source of the onboard electrical system is deactivated when, for example, one of the following conditions is additionally detected: the motor vehicle is at a standstill (at zero speed), the motor of the motor vehicle is switched off, the ignition circuit of the motor vehicle is open, or the maintenance mode of the motor vehicle is activated. These conditions indicate a desired de-energizing of the onboard electrical system by means other than removal of an electrically conductive connection. By taking into account these example conditions for a desired de-energizing of the onboard electrical system, the differentiation between an intentional interruption and another type of interruption of the electrically conductive connection provides for achieving a better sensitivity of the detection of the interruption of the electrically conductive connection. For even better sensitivity, one or more of these conditions can be considered cumulatively or alternatively combined in the context of the evaluation of the decisional criteria.

Moreover, it is particularly advantageous if the first power source is a battery bank, in particular comprising a lead-acid battery. As previously mentioned, lead-acid batteries are still used on modern vehicles as a standardized first power source, so that the presence of a usual lead-acid battery does not allow the inference that it is the only power source in the motor vehicle. Thus, the safety effect of the method is particularly advantageous in the case of batteries used as power sources. Alternatively, or additionally, it may be envisaged that the second power source is a battery bank, in particular consisting of a lithium-ion battery. The operation of onboard electrical systems with a battery bank as a second power source is the object of intensive development efforts in the automotive industry. In particular, for increasing the cycling resistance in a lead-acid battery as a first power source, the additional arrangement of a second power source formed by a lithium-ion battery is proposed. Because of this second power source, in particular a lithium-ion battery, it is particularly advantageous if the method disclosed herein is used, in case of an intentional interruption of the electrically conductive connection between the first power source and the onboard electrical system, for achieving an automatic separation of the battery bank. Alternatively, or additionally, it may also be advantageous if the second power source is a direct voltage converter of the onboard electrical system, which is provided for coupling a second partial onboard electrical system. This is particularly advantageous in modern onboard electrical systems, which are comprised of a plurality of partial systems, wherein the partial electrical systems typically have different voltage levels. These may comprise, in addition to conventional operating voltages of 12 V or 24 V, 48V partial electrical systems or high voltage systems for operating an electrical drive of the motor vehicle, for example, wherein voltages of many hundreds of volts may be present. In each case, the partial electrical circuits are coupled to each other by at least one direct voltage converter. Thus, to ensure the absence of voltage in the entire onboard electrical system, it is particularly advantageous to interrupt the interfaces between the partial electrical systems by deactivating the direct voltage converters.

Finally, in an exemplary embodiment of the method, it is particularly advantageous if a battery bank consisting of at least one battery used as a second power source has a safety switch device, which is controlled for interrupting an electrically conductive connection to the onboard electrical system for separation of such battery bank. Such a safety switch is usually provided to protect a second power source such as a battery from overvoltages or undervoltages, and to separate it as required from the onboard electrical system. This is particularly true when the second power source is a lithium-ion battery. In this respect, existing circuits of the battery may be used for performing the method. The safety switch may thus be used according to the method for performing a second function. A particularly advantageous synergistic effect is achieved when the first power source is a battery bank, in particular consisting of a lead-acid battery, provided with the above mentioned current sensor. When a modern lead-acid battery is used as a primary power source, typically a current sensor monitoring its negative pole is already present. The advantages of the method disclosed herein may thus be achieved with little or no additional hardware, so that only a control-related implementation of the method is required. Thus, a particularly simple and economical implementation may be achieved.

Various embodiments may be implemented using a motor vehicle, comprising: a motor; an electrical onboard system, which further comprises a first power source and at least one second power source for providing an operating voltage for at least one partial onboard electrical system; and a control device for performing embodiments of the method disclosed herein.

All embodiments of the method may be analogously applied to the motor vehicle, so that the cited advantages may also be achieved therewith.

Further advantages and details of the motor vehicle can be understood from FIG. 1, which shows a schematic representation of an exemplary embodiment of a motor vehicle 1 with an onboard electrical system 2, a bus system 3, and a control device 4 for performing the method disclosed herein.

The onboard electrical system 2 comprises a first partial onboard electrical system 5 and a second partial onboard electrical system 6, which are connected to each other by means of a second power source provided by a direct voltage converter 7. The first partial onboard electrical system 5 has an operating voltage of 12 V and comprises a first power source provided by a lead-acid battery 8 and a second parallel connected power source formed by a lithium-ion battery 9. Moreover, in the first partial onboard electrical system 5, a generator 10 is provided for generating an electrical current for charging the lead-acid battery 8 and the lithium-ion battery 9 and for supplying power to users 11.

The direct voltage converter 7 connects the first partial onboard electrical system 5 with the second partial onboard electrical system 6, which is only schematically shown. It may, for example, be composed of a high-voltage partial onboard electrical system having an operating voltage of up to several hundred volts and may be provided with an electrical machine for driving the motor vehicle 1. However, the partial onboard electrical system may also be a low-voltage system having an operating voltage of 24, 36, or 48 volts. In any case, the direct voltage converter 7 is used for converting the voltage levels of the first partial onboard electrical system 5 and the second partial onboard electrical system 6 and may be a unidirectional or bidirectional DC/DC converter.

Regarding the first partial onboard electrical system 5, it is to be noted that the lead-acid battery 8 has a current sensor 13 at its negative pole 12, which sensor detects the current flowing from and to the motor vehicle mass 14, specifically the vehicle's chassis ground. The lithium-ion battery 9 also has a safety switch 15, which separates the lithium-ion battery 9 from the onboard electrical system 2 in case of an overvoltage or undervoltage that could potentially damage the onboard electrical system 2. The lithium-ion battery 9 forms a unit with the safety switch 15 and a plurality of energy storage cells, which unit is housed within a single common housing.

The control device 4 has control connections to the direct voltage converter 7 and to the safety switch device 15 of the lithium-ion battery 9. Additionally, the control device 4 is connected to the current sensor 13 and the bus system 3 by means of a data line. The bus system 3 provides the control device 4 in particular with information regarding the speed of the motor vehicle 1, the operating status of the motor (not shown) of vehicle 1, the operating status of the ignition circuit (not shown) of vehicle 1, and the activation state of a maintenance mode of vehicle 1.

An exemplary embodiment of the method for operating the onboard electrical system 2 of the motor vehicle 1 is described in the following:

The control device 4 continually monitors whether an intentional interruption of the electrically conductive connection of the lead-acid battery 8 with the onboard electrical system 2, in particular with its first partial onboard electrical system 5, is present. To this end, the control device 4 uses a decisional criterion, which is applied on data received from the current sensor 13 and the bus system 3. Initially, it detects whether an interruption of the electrically conductive connection of the lead-acid battery 8 with the motor vehicle mass 14 is present, by checking the absolute value of the current detected by the current sensor 13, in order to determine whether current falls below the current threshold. This current threshold is selected so that if current falls below this threshold, it is sufficiently ensured that an actual interruption of the electrically conductive connection of the lead-acid battery 8 to the onboard electrical system 2 is present, and in this case, is selected equal to 1 mA. Thus, measurement values of the current sensor 13 that are different from 0 A, which are due, for example, to a measurement offset and/or noise components, are considered in detecting a missing current flow.

To determine that a detected interruption of the electrical connection is actually intentional, in particular because an operator, in the context of a maintenance or repair intervention, has separated the lead-acid battery 8 from the onboard electrical system 2, in evaluating the decisional criteria it is also checked whether the motor vehicle 1 is standing still (thus having zero speed), whether the motor is off, whether the ignition circuit is open, and whether the maintenance mode of the vehicle 1 has been activated. It may, however, also be envisaged that among these additional conditions, one or more are considered, logically coupled, in the context of the evaluation of the decisional criteria. In particular, the additional condition that the motor vehicle 1 is standing still may be considered. If all required conditions, including the interruption of the electrically conductive connection from the lead-acid battery 8 to the onboard electrical system 2, are fulfilled, then the control device 4 rules that the decisional criteria are fulfilled.

In this case, the control device 4 controls the safety switch device 15 by opening it and deactivates the direct voltage converter 7. Thus, the operator may perform his duties of maintenance or repair safely. In particular, it is thus prevented that the operator overlooks the second power sources provided by the lithium-ion battery 9 and the direct voltage converter 7 and unintentionally causes a short-circuit within the onboard electrical system 2.

Finally, it is to be noted that also the second partial onboard electrical system 6 may obviously have a second power source (not shown), which comprises an integrated safety switch or which is assigned to an additional switch for separating from the onboard electrical system 2, wherein the safety switch or the additional switch may be controlled by the control device 4 in analogy to the safety switch device 15 and the lithium-ion battery 9. In such a case, the second partial onboard electrical system 6 is a low-voltage partial onboard electrical system, and the direct voltage converter 7 is a bidirectional DC/DC converter, for example.

The invention claimed is:

1. A method for operating an electrical system of a motor vehicle, the motor vehicle comprising a motor, and the electrical system comprising a first power source for providing an operating voltage for at least one part of the electrical system and at least a second power source, comprising the steps of:
   monitoring, by a control system of the motor vehicle, an electrically conductive connection of the first power source to the electrical system to detect an interruption of the electrically conductive connection;
   detecting, by the control system, at least one condition indicative of a voluntary removal of an electrical contact in the electrically conductive connection;
   detecting, by the control system, an intentional interruption of the electrically conductive connection when both the interruption of the electrically conductive connection is detected and the at least one condition is detected;
   separating, by the control system, in response to the detected intentional interruption of the electrically conductive connection, the at least one second power source of the electrical system from the electrical system; and
   deactivating, by the control system, in response to the detected intentional interruption of the electrically conductive connection, the at least one second power source of the electrical system.

2. The method of claim 1, wherein the monitoring is of the electrically conductive connection located between a negative pole of the first power source and a vehicle mass of the motor vehicle.

3. The method of claim 1, wherein the detecting is performed by a current sensor assigned to the first power source for detecting a current flowing through the first power source, wherein the interruption of the electrically conductive connection is detected when the current sensor detects no current flowing through the first power source.

4. The method of claim 1, wherein the at least one condition comprises the motor vehicle standing at zero speed, the motor of the motor vehicle being off, an ignition circuit of the motor vehicle being open, or a maintenance mode of the motor vehicle being activated.

5. The method of claim 1, wherein the first power source is a first battery bank and the second power source is a direct voltage converter of the electrical system, wherein the direct voltage converter is connected to the electrical system and a second battery bank.

6. The method of claim 5, wherein the first battery bank comprises at least one lead-acid battery and the second battery bank comprises at least one lithium-ion battery.

7. The method of claim 5, wherein the second battery bank has a safety switch device, wherein the safety switch device is controlled to separate the second battery bank for interrupting the electrically conductive connection with the electrical system.

8. A motor vehicle, comprising:
a motor;
an onboard electrical system, the onboard electrical system further comprising a first power source for providing an operating voltage for at least one part of the onboard electrical system and at least a second power source, and
a control device, wherein the control device is configured to:
monitor an electrically conductive connection of the first power source to the onboard electrical system to detect an interruption of the electrically conductive connection;
detect at least one condition indicative of a voluntary removal of an electrical contact in the electrically conductive connection;
detect an intentional interruption of the electrically conductive connection when both the interruption of the electrically conductive connection is detected and the at least one condition is detected;
separate, in response to the detected intentional interruption of the electrically conductive connection, the at least one second power source of the onboard electrical system from the onboard electrical system; and
deactivate, in response to the detected intentional interruption of the electrically conductive connection, the at least one second power source of the onboard electrical system.

9. The motor vehicle of claim 8, wherein the control device is configured to monitor the electrically conductive connection located between a negative pole of the first power source and a vehicle mass of the motor vehicle.

10. The motor vehicle of claim 8, wherein the control device is configured to detect the intentional interruption of the electrically conductive connection using a current sensor assigned to the first power source for detecting a current flowing through the first power source, wherein the interruption of the electrically conductive connection is detected when the current sensor detects no current flowing through the first power source.

11. The motor vehicle of claim 8, wherein the at least one condition comprises the motor vehicle standing at zero speed, the motor of the motor vehicle being off, an ignition circuit of the motor vehicle being open, or a maintenance mode of the motor vehicle being activated.

12. The motor vehicle of claim 8, wherein the first power source is a first battery bank and the second power source is a direct voltage converter of the onboard electrical system, wherein the direct voltage converter is connected to the onboard electrical system and a second battery bank.

13. The motor vehicle of claim 12, wherein the first battery bank comprises at least one lead-acid battery and the second battery bank comprises at least one lithium-ion battery.

14. The motor vehicle of claim 12, wherein the second battery bank has a safety switch device, wherein the safety switch device is controlled to separate the second battery bank for interrupting the electrically conductive connection with the onboard electrical system.

* * * * *